UNITED STATES PATENT OFFICE.

LORENZO D. GORTON, OF PHILADELPHIA, PENNSYLVANIA, ASSIGNOR TO CHARLES N. GORTON, OF SAME PLACE.

IMPROVEMENT IN ARTICLES OF FOOD FOR PASTRY, PUDDINGS, &c.

Specification forming part of Letters Patent No. 172,114, dated January 11, 1876; application filed July 17, 1875.

*To all whom it may concern:*

Be it known that I, LORENZO D. GORTON, of the city and county of Philadelphia, and State of Pennsylvania, have invented a new and useful Article of Food for Making Pastry, Puddings, &c., which improvement is fully set forth in the following specification.

In the preparation of the desiccated cocoa-nuts, as heretofore accomplished, the kernels are rasped or grated, and in a granular condition are mixed with sugar, and placed in paper boxes for the convenience of consumers.

I am aware that patents have been granted for the manufacture of desiccated cocoa-nuts, each for a different process, among which are those of Maltby and Smith, dated June 25, 1867, in which sugar is added to the grated meat, and the mass heated in a kiln or oven; and the patent of G. W. Waitt, dated July 7, 1868, in which the grated meat is heated and dried, before the sugar is added, by placing it on a slab heated by steam or hot water.

The article of food as prepared by me is different from either of the above, or from anything heretofore known, inasmuch as I employ four different articles to complete the compound, two of which are of a farinaceous nature, which are highly nutritious and easily digested, and which also absorb the stearine in the cocoa-nut meat to such an extent as to render the preparation much harder and drier, and cause it to keep longer, than by any other process. In my process of preparing the food, which, as stated, contains grated cocoa-nut meat, I am careful not to evaporate or expel all the moisture from the meat before adding the sugar and other ingredients. I simply increase the temperature to such a degree as will cause the ingredients to adhere to the cocoa-nut granules, and after these are added the heating process is completed.

I take, say, fifty pounds of the finely-grated cocoa-nut meat, and heat it slightly over an ordinary fire. I then take, say, twenty pounds of pulverized white sugar, eight pounds of corn-starch, and six pounds of rice-flour, the whole being mixed together, and occasionally stirred until thoroughly dried, after which the mass is removed to tables, troughs, or boxes to cool, and is then ready for use.

What I claim as my invention is—

A new and useful article of food composed of grated cocoa-nut meat, pulverized white sugar, rice-flour, and corn-starch, in or about the proportions specified.

LORENZO D. GORTON.

Witnesses:
ALEXANDER H. MORGAN,
ISAAC R. OAKFORD.